P. SCOTT.
Fire-Kindler.

No. 217,414.    Patented July 8, 1879.

UNITED STATES PATENT OFFICE.

PEMBROKE SCOTT, OF PHILADELPHIA, PENNSYLVANIA.

IMPROVEMENT IN FIRE-KINDLERS.

Specification forming part of Letters Patent No. 217,414, dated July 8, 1879; application filed February 15, 1879.

*To all whom it may concern:*

Be it known that I, PEMBROKE SCOTT, of Philadelphia, in the county of Philadelphia and State of Pennsylvania, have invented a new and valuable Improvement in Fire-Kindlers; and I do hereby declare that the following is a full, clear, and exact description of the construction and operation of the same, reference being had to the annexed drawings, making a part of this specification, and to the letters and figures of reference marked thereon.

Figure 1:
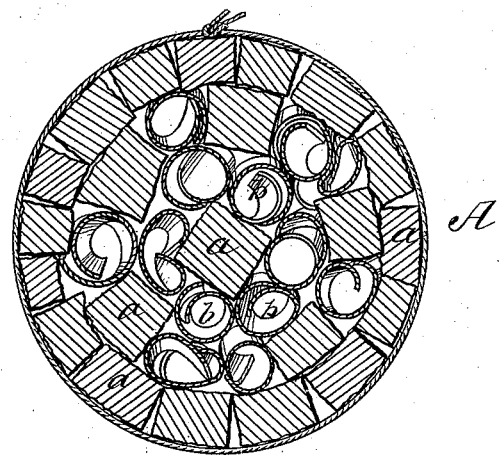
Figure 2:
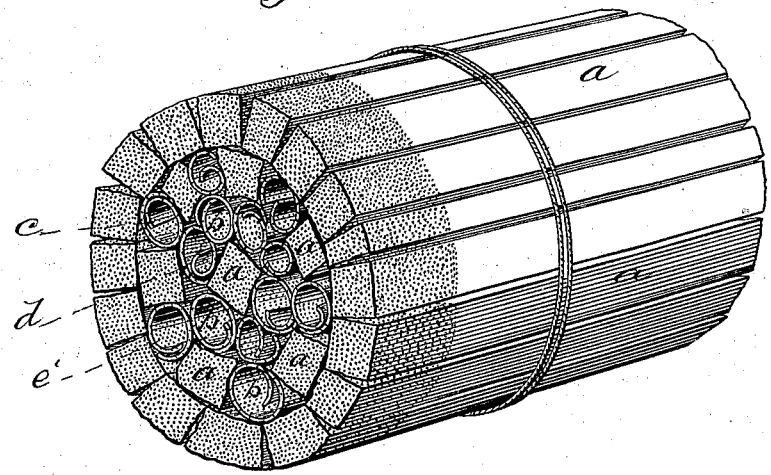

Figure 1 of the drawings is a representation of a cross-section of my improved fire-kindler. Fig. 2 is a perspective view thereof.

This invention has relation to improvements in fire-kindlers; and the nature of the invention consists in a wood-kindler composed of wood, sticks, and shavings wound into spiral form and intermingled with the sticks, the whole being bound together into a bundle and dipped into rosin, as will be hereinafter more fully set forth.

In the annexed drawings, the letter A designates my improved kindler, composed of sticks $a$, of suitable size, and of shavings $b$, wound in spiral form and forming tubes $c$. The bundle is built up around a center stick, $a$, the shavings being then arranged in a ring about it, as shown at $d$. Exterior to this ring is a second ring, $e'$, composed of intermingled sticks and shavings, the whole being inclosed within an outside casing of sticks, as shown at $f$, and bound together with a cord. The shavings are usually of a coarse kind, so that when wound into tubes the latter will possess considerable strength for resisting lateral strain and crushing. The whole bundle is dipped at one end into melted rosin and is then ready for use.

The rosined end of the kindler being lit, the entire bundle is dropped into the stove. The spirals or tubes serve as draft-flues, and admit the flame to every part of the bundle, insuring a speedy lighting up of the same. This arrangement of the tubes and sticks is that which I preferably use; but I do not confine myself specifically thereto, as there are modes of assembling them—for instance, by interspersing the tubes among the sticks—which would be nearly as effective.

What I claim as new, and desire to secure by Letters Patent, is—

1. A fire-kindler composed of wood, sticks, and shavings wound into the form of tubes and intermingled with the sticks, the whole being bound up into a bundle and dipped at one end into rosin, substantially as specified.

2. A fire-kindler consisting of a central stick, a ring of tubes formed of shavings surrounding the same, a second ring of intermingled shavings and sticks, and an exterior casing of sticks, the whole bound up into a bundle, substantially as specified.

In testimony that I claim the above I have hereunto subscribed my name in the presence of two witnesses.

PEMBROKE SCOTT.

Witnesses:
ALLEN H. GANGEWER,
E. L. PERDRIAUX.